US012678839B1

(12) United States Patent
Iversen et al.

(10) Patent No.: US 12,678,839 B1
(45) Date of Patent: Jul. 14, 2026

(54) SYSTEM AND METHOD FOR LANDFILL DEWATERING USING A VENTURI AIR LIFT LIQUID PUMP

(71) Applicant: WM Intellectual Property Holdings, L.L.C., Houston, TX (US)

(72) Inventors: Robert Iversen, Houston, TX (US); Michael Caldwell, Spring, TX (US); Seth Ramaley, Atlanta, GA (US); Yoansy Vina, Houston, TX (US)

(73) Assignee: WM Intellectual Property Holdings, L.L.C., Houston, TX (US)

( * ) Notice: Subject to any disclaimer, the term of this patent is extended or adjusted under 35 U.S.C. 154(b) by 0 days.

(21) Appl. No.: 18/931,953

(22) Filed: Oct. 30, 2024

Related U.S. Application Data

(60) Provisional application No. 63/546,484, filed on Oct. 30, 2023.

(51) Int. Cl.
B09B 1/00 (2006.01)
F04F 5/46 (2006.01)

(52) U.S. Cl.
CPC ................ B09B 1/006 (2013.01); *F04F 5/46* (2013.01)

(58) Field of Classification Search
CPC .................................. B09B 1/006; F04F 5/46
See application file for complete search history.

(56) References Cited

U.S. PATENT DOCUMENTS

| | | | | | |
|---|---|---|---|---|---|
| 44,587 | A | * | 10/1864 | Angiers | ..................... F04F 5/46 |
| | | | | | 417/151 |
| 46,931 | A | * | 3/1865 | Pease | ......................... F04F 5/46 |
| | | | | | 417/151 |
| 47,399 | A | * | 4/1865 | Crooker | |
| 92,718 | A | * | 7/1869 | Glass | |
| 592,820 | A | * | 11/1897 | Nermoyle | ............. F16L 43/001 |
| | | | | | 285/329 |

(Continued)

FOREIGN PATENT DOCUMENTS

| | | | | |
|---|---|---|---|---|
| CN | 103374965 | A | 10/2013 | |
| DE | 4228363 | C1 * | 1/1994 | ............. B09B 1/006 |

OTHER PUBLICATIONS

Eden, Christopher; Combined landfill gas and leachate extraction systems; UKPS Ltd.; Oct. 21, 2024; 14 pages.

(Continued)

*Primary Examiner* — Janine M Kreck

(74) *Attorney, Agent, or Firm* — Greenberg Traurig LLP

(57) ABSTRACT

A system and method for enhanced leachate collection from a solid waste landfill site are provided. The landfill site can include, without limitation, one or more landfill waste layers, one or more leachate layers, a landfill liner layer, and a groundwater layer. A landfill gas well extends from the ground surface and passes down through the landfill waste layer and encounters a leachate layer within the waste mass. The well is configured to capture landfill gas and remove leachate from the leachate layer of the landfill site and transport it to the landfill surface. An airlift venturi pump can create venturi effect and generate discharge to deliver leachate to the landfill surface. The leachate can be piped to a gravity drain system, frac tank, collection sump or other onsite holding area, or transported to an approved offsite location for disposal.

16 Claims, 2 Drawing Sheets

(56)  References Cited

U.S. PATENT DOCUMENTS

| | | | | |
|---|---|---|---|---|
| 1,333,713 | A | * | 3/1920 | Hopkins .................. F04F 1/18 |
| | | | | 417/151 |
| 2,025,644 | A | * | 12/1935 | Campbell ................ F04F 1/18 |
| | | | | 417/151 |
| 2,236,687 | A | * | 4/1941 | Jacuzzi .................... F04F 5/46 |
| | | | | 417/172 |
| 2,360,427 | A | * | 10/1944 | Lapp ....................... F16L 41/02 |
| | | | | 138/140 |
| 2,362,442 | A | * | 11/1944 | Baily ..................... F04F 5/466 |
| | | | | 417/108 |
| 3,980,138 | A | * | 9/1976 | Knopik .................. B09C 1/002 |
| | | | | 166/372 |
| 5,128,052 | A | | 7/1992 | Bullock |
| 5,620,593 | A | | 4/1997 | Stagner |
| 5,628,623 | A | * | 5/1997 | Skaggs .................. F04F 5/466 |
| | | | | 417/313 |
| 5,709,505 | A | | 1/1998 | Williams et al. |
| 2003/0196803 | A1 | | 10/2003 | Kingsley |
| 2007/0000841 | A1 | | 1/2007 | Harrington et al. |
| 2013/0333874 | A1 | | 12/2013 | Bollingham |

OTHER PUBLICATIONS

Leachate Expert; Leachate Pumps—Leachate Pumping Systems; leachate.co.uk; Jan. 18, 2011; 5 pages.

* cited by examiner

SYSTEM AND METHOD FOR LANDFILL DEWATERING USING A VENTURI AIR LIFT LIQUID PUMP

RELATED APPLICATION

This application claims the benefit, and priority benefit, of U.S. Provisional Patent Application Ser. No. 63/546,484, filed Oct. 30, 2023, the disclosure and contents of which are incorporated by reference herein in its entirety.

BACKGROUND

1. Field of the Invention

The presently disclosed subject matter relates generally to leachate collection, and more particularly, to a system and method for enhanced leachate collection from a solid waste landfill site.

2. Description of the Related Art

Leachate is liquid derived from the infiltration of precipitation that drains from landfills to a protected collection system. When the liquid filters through wastes placed in a landfill, the water leaches, or draws out, chemicals or constituents from those wastes. Leachate is non-hazardous and must be collected for removal and disposal in accordance with the site's operating permit(s).

Leachate can be pumped from the landfill using collection sumps that pump the leachate from the bottom of the landfill liner system to collection tanks. Historically, leachate collection systems have had certain limitations. For example, these prior systems have typically been maintenance intensive and have not been designed for targeted dewatering for specific applications that involve liquids that do not percolate to the lower leachate collection system. Rather, they are designed to remove liquid that infiltrates through the landfill and collects on the bottom liner system.

Improvements in this field of technology are therefore desired.

SUMMARY

Various illustrative embodiments of a system and method for enhanced leachate collection from a solid waste landfill site are provided herein.

In certain illustrative embodiments, a system for collecting leachate from a solid waste landfill is provided. The system can include a landfill gas well that extends from a ground surface and through a landfill waste layer to a leachate layer within the solid waste landfill; and an airlift venturi pump disposed within the gas well and configured to collect leachate from the leachate layer, the airlift venturi pump comprising an upstream entry pipe configured to deliver leachate from the landfill, an airlift section in fluid communication with the upstream entry pipe and configured to receive leachate from the upstream entry pipe, the airlift section comprising an inlet pipe, an outlet pipe, a throat disposed between the inlet pipe and the outlet pipe, wherein the throat has a diameter that is narrower than both the inlet pipe and the outlet pipe, and an air conveyance pipe configured to inject air into the throat through the inlet pipe; and a downstream exit pipe configured to deliver leachate away from the airlift section. The system can further comprising an upstream riser section in fluid communication with the upstream entry pipe and configured to deliver leachate to the upstream entry pipe and a downstream riser section in fluid communication with the upstream entry pipe and configured to deliver leachate to the downstream exit pipe.

In certain illustrative embodiments, a method for collecting leachate from a solid waste landfill is provided. The leachate can be passed through an airlift venturi pump, the airlift venturi pump comprising an upstream entry pipe configured to receive the leachate from the landfill, an airlift section in fluid communication with the upstream entry pipe, the airlift section having an inlet pipe, an outlet pipe, and a throat disposed between the inlet pipe and the outlet pipe, the throat having a diameter that is narrower than both the inlet pipe and the outlet pipe, and a downstream exit pipe in fluid communication with the airlift section and configured to transport the leachate away from the airlift section. An air stream can be introduced into the throat, and a venturi effect can be facilitated in the throat to create a vacuum and pull the leachate therethrough. The airlift venturi pump further can further comprise an upstream riser section in fluid communication with the upstream entry pipe and configured to deliver leachate to the upstream entry pipe and a downstream riser section in fluid communication with the upstream entry pipe and configured to deliver leachate to the downstream exit pipe.

In certain illustrative embodiments, a method for leachate collection at a solid waste landfill site is provided. The landfill site can be an active or an inactive landfill. The landfill can include at least one landfill gas well with an airlift venturi pump disposed thereon. An air conveyance pipe can be disposed on the airlift venturi pump. A stream of air flow can be injected into the airlift venturi pump using the air conveyance pipe. The amount of air injected into the airlift venturi pump will vary depending upon how much is needed to effectively aid and facilitate delivery of leachate to the landfill surface.

In certain illustrative embodiments, an airlift venturi pump for collecting leachate from a solid waste landfill is provided. The airlift venturi pump can include an upstream entry pipe configured to receive the leachate from the landfill, an airlift section in fluid communication with the upstream entry pipe and configured to receive leachate from the upstream entry pipe, the airlift section comprising an inlet pipe, an outlet pipe, a throat disposed between the inlet pipe and the outlet pipe, wherein the throat has a diameter that is narrower than both the inlet pipe and the outlet pipe, and wherein the throat is configured to facilitate a venturi effect and transport the leachate therethrough, and an air conveyance pipe configured to inject air into the throat; and a downstream exit pipe in fluid communication with the airlift section and configured to transport the leachate away from the airlift section. The airlift venturi pump can further comprising an upstream riser section in fluid communication with the upstream entry pipe and configured to deliver leachate to the upstream entry pipe and a downstream riser section in fluid communication with the downstream exit pipe and configured to deliver leachate away from the downstream exit pipe.

While the presently disclosed subject matter will be described in connection with the preferred embodiment, it will be understood that it is not intended to limit the presently disclosed subject matter to that embodiment. On the contrary, it is intended to cover all alternatives, modifications, and equivalents, as may be included within the spirit and the scope of the presently disclosed subject matter as defined by the appended claims of a corresponding non-provisional patent application.

DETAILED DESCRIPTION

The presently disclosed subject matter relates to a system and method for enhanced leachate collection from a solid waste landfill site.

Figure 1:
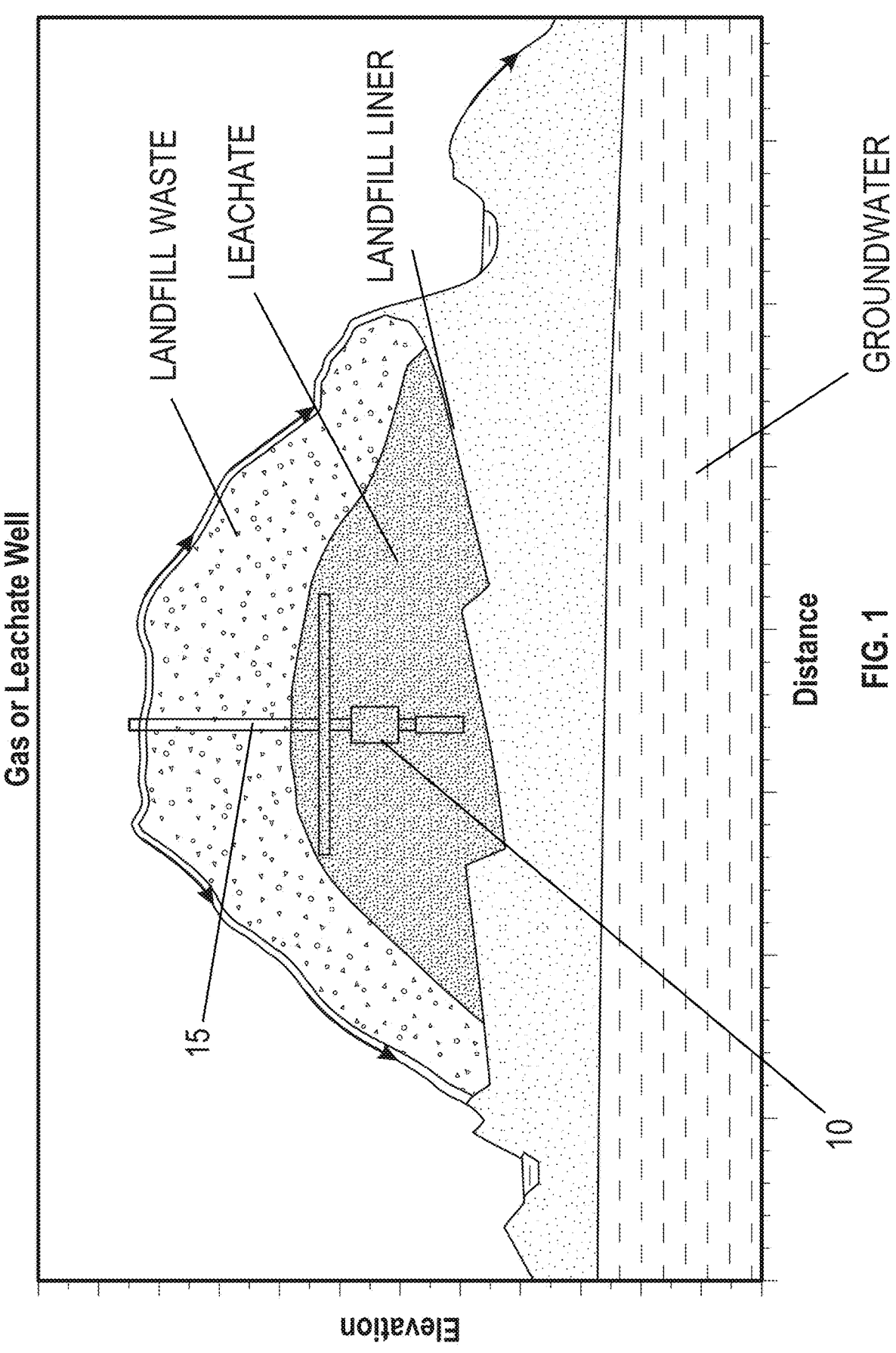
FIG. 1 is a side cutaway view of a leachate collection system with an airlift venturi pump at a solid waste landfill site, according to embodiments of the present disclosure.

An illustrative embodiment of a leachate collection system at a solid waste landfill site is shown in FIG. 1 herein. The landfill site includes, without limitation, one or more landfill waste layers, one or more leachate layers, a landfill liner layer, and a groundwater layer.

A landfill gas well 15 extends from the ground surface and passes down through the landfill waste layer and encounters a leachate layer within the waste mass. The well 15 is configured to capture landfill gas and remove leachate from the leachate layer of the landfill site and transport it to the landfill surface, where it can be piped to a gravity drain system, frac tank, collection sump or other onsite holding area. If necessary, the leachate can also be transported to an approved offsite location for disposal.

In certain illustrative embodiments, an airlift venturi pump 10 is installed in the landfill gas well 15. The purpose of the airlift venturi pump 10 is to aid and facilitate delivery of leachate to the landfill surface so it can be removed from the landfill site. Among the primary reasons for removing leachate from the landfill site include opening pore spaces to reduce GHG emissions and enhance methane recovery for RNG projects, preventing or mitigating the potential for slope instability on the ground surface, mitigating liquid accumulation, and meeting regulatory requirements for improved gas efficiency, odor prevention, maintaining head on liner compliance and mitigating liquid seeps.

Figure 2:
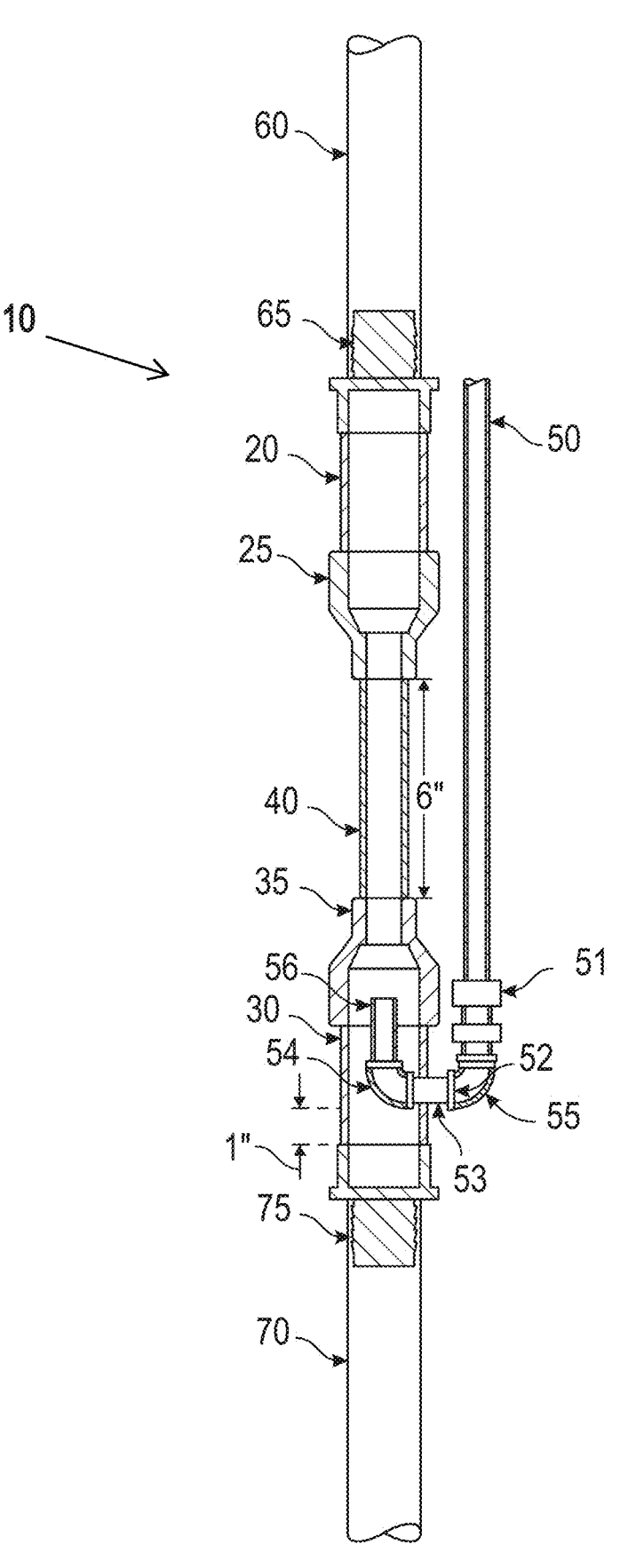
FIG. 2 is a side cutaway view of an airlift venturi pump, according to embodiments of the present disclosure.

An illustrative embodiment of an airlift venturi pump 10 is shown in FIG. 2 herein. The airlift venturi pump 10 is a venturi air lift liquid pump and can include (without limitation): a venturi pipe (or throat) 40, an air conveyance pipe 50, an upstream entry pipe section 30, and a downstream discharge or exit pipe section 20.

In certain illustrative embodiments, the venturi pipe 40 can have a pipe size diameter of 1 inch which is a reduction from the 2 inch upstream entry pipe 30, and then an expansion back to 2 inch at the downstream discharge pipe 20. There can also be a 2 inch to 1 inch reducer or inlet pipe 35 at the interface of the upstream entry pipe 30 and the venturi pipe 40, and another 2 inch to 1 inch reducer or outlet pipe 25 at the interface of the downstream discharge pipe 20 and the venturi pipe 40. The 2 inch to 1 inch reducer 35 at the interface of the upstream entry pipe 30 and the venturi pipe 40 creates a pressure drop and corresponding vacuum behind it that pulls liquid into the venturi pipe 40.

While the pipe sizes described herein are representative of a preferred embodiment, other pipe sizes may also be used without departing from the spirit and scope of the presently disclosed subject matter.

In certain illustrative embodiments, the air conveyance pipe 50 includes a flange connection 51 to an air conveyance fitting 52 with a pair of 90 degree elbows 54, 55 to inject air upward into the venturi pipe 40. The downstream discharge pipe 20 is downstream of 2 inch to 1 inch reducer or outlet pipe 25 and is configured for the discharge of a multiphase water/air mix. Injected air creates a vacuum and lifts by utilizing the natural buoyancy of air within the downstream discharge pipe 20. Downstream riser pipe 60 delivers the multiphase water/air mix towards the ground surface.

During operation of the airlift venturi pump 10, air is injected from the air conveyance pipe 50 through the air conveyance fitting 52 across the venturi pipe 40 (upward toward the landfill surface) and the airlift venturi pump 10 self-primes and begins to stack columns of leachate and air in the discharge pipe. As the stacking of leachate and air progresses, the airlift venturi pump 10 will generate discharge and deliver leachate to the landfill surface. The venturi effect creates vacuum and leachate (gas well liquid) is delivered from upstream riser section 70 and drawn through the 2 inch upstream entry pipe 30 and into the venturi pipe 40. In general, the venturi effect is the reduction in fluid pressure that results when a moving fluid speeds up as it flows through a constricted section of a pipe. The reduction in pressure inside the constriction can be used for producing a vacuum and moving fluids with increased velocity.

The presently disclosed airlift venturi pump 10 has a number of advantages over other pumps that are currently used in landfill gas wells. These advantages include, without limitation, lower maintenance and longer run times, higher flow rates, and lower cost.

Landfills are harsh environments, and the current pumps for landfill gas wells constantly require maintenance and/or replacement to keep them running. These pumps often use air bladder pump mechanisms to create vacuum and have screens through which the liquid is extracted. These screens clog and cause the pumps to constantly shut down or pump at very low extraction rates. The advantage of the presently disclosed airlift venturi pump 10 is that there are no moving parts to clog and therefore, longer run times are achieved.

Moreover, the air-lift vacuum through the presently disclosed airlift venturi pump 10 produces higher flow rates compared to air-blader systems. Overall rates for the air-bladder system range from <1 to 5 gpm, however, the long term rate for these pumps is often <1 gpm considering all the downtime and maintenance issues. Pilot tests for the presently disclosed airlift venturi pump 10 showed flow rates from 1 gpm to over 10 gpm with average flow rates in the 5 gpm range for the main pilot test well. In addition, the pump in the main pilot test well ran for 3.5 months with no required maintenance.

In addition, the presently disclosed airlift venturi pump 10 has no moving parts and uses air to create the vacuum across a venturi and then uses the buoyancy of the injected air to create lift for the liquids and deliver them to the landfill surface connections out of the well. By comparison, the current pumps used by industry are pneumatic bladder type pumps or electrical pumps with higher start-up and maintenance costs and extract liquids at a reduced rate based on field data. Moreover, the presently disclosed airlift venturi pump 10 does not seize up when encountering fines, sediments and sludge.

In certain illustrative embodiments, a leachate collection system at a solid waste landfill site is provided. The leachate collection system can include (without limitation): a landfill waste, leachate layer(s), a landfill gas well 15 extending from the ground surface and passing down through the landfill waste layer, and encountering the leachate layer, and an airlift venturi pump 10. The landfill gaswell 15 can be configured to drain leachate from the leachate layer of the landfill site to the leachate collection system or to the landfill surface. The airlift venturi pump 10 can include a venturi pipe 40, an air conveyance pipe 50, an upstream entry pipe 30, and a downstream discharge pipe 20, wherein the air conveyance pipe 50 is configured to inject an air stream into the venturi pipe 40 to aid and facilitate delivery of leachate to the landfill surface.

In certain illustrative embodiments, a method for leachate collection at a solid waste landfill site is provided. The landfill site can be an active or an inactive landfill. The landfill can include at least one landfill gas well 15 with an airlift venturi pump 10 disposed thereon. An air conveyance pipe 50 can be disposed on the airlift venturi pump 10. A stream of air flow can be injected into the airlift venturi pump 10 using the air conveyance pipe 50. The amount of air injected into the airlift venturi pump 10 will vary depending upon how much is needed to effectively aid and facilitate delivery of leachate to the landfill surface.

In certain illustrative embodiments, a pump for collecting leachate from a solid waste landfill is provided. The pump can be an airlift venturi pump 10 and can include an upstream entry pipe 30 configured to receive the leachate from the landfill, an airlift section in fluid communication with the upstream entry pipe and configured to receive leachate from the upstream entry pipe, the airlift section comprising an inlet 35, an outlet 25, a throat 40 disposed between the inlet 35 and the outlet 25, wherein the throat 40 has a diameter that is narrower than both the inlet 35 and the outlet 25, and wherein the throat 40 is configured to facilitate a venturi effect and transport the leachate therethrough, and an air conveyance pipe 50 configured to inject air into the throat 40; and a downstream exit pipe 20 in fluid communication with the airlift section and configured to transport the leachate away from the airlift section. The airlift venturi pump 10 can further comprising an upstream riser section 70 in fluid communication with the upstream entry pipe 30 and configured to deliver leachate to the upstream entry pipe 30 and a downstream riser section 60 in fluid communication with the downstream exit pipe 20 and configured to deliver leachate away from the downstream exit pipe 20.

In certain illustrative embodiments, a system for collecting leachate from a solid waste landfill is provided. The system can include a landfill gas well 15 that extends from a ground surface and through a landfill waste layer to a leachate layer within the solid waste landfill; and an airlift venturi pump 10 disposed within the gas well 15 and configured to collect leachate from the leachate layer, the airlift venturi pump 10 comprising an upstream entry pipe 30 configured to deliver leachate from the landfill, an airlift section in fluid communication with the upstream entry pipe and configured to receive leachate from the upstream entry pipe, the airlift section comprising an inlet 35, an outlet 25, a throat 40 disposed between the inlet 35 and the outlet 25, wherein the throat 40 has a diameter that is narrower than both the inlet 35 and the outlet 25, and an air conveyance pipe 50 configured to inject air into the throat 40 through the inlet 35; and a downstream exit pipe 20 configured to deliver leachate away from the airlift section. The system can further comprising an upstream riser section 70 in fluid communication with the upstream entry pipe 30 and configured to deliver leachate to the upstream entry pipe 30 and a downstream riser section 60 in fluid communication with the upstream entry pipe 20 and configured to deliver leachate to the downstream exit pipe 20.

In certain illustrative embodiments, a method for collecting leachate from a solid waste landfill is provided. The leachate can be passed through an airlift venturi pump 10, the airlift venturi pump 10 comprising an upstream entry pipe 30 configured to receive the leachate from the landfill, an airlift section in fluid communication with the upstream entry pipe 30, the airlift section having an inlet 35, an outlet 25, and a throat 40 disposed between the inlet 35 and the outlet 25, the throat 40 having a diameter that is narrower than both the inlet 35 and the outlet 25, and a downstream exit pipe 20 in fluid communication with the airlift section and configured to transport the leachate away from the airlift section. An air stream can be introduced into the throat 40, and a venturi effect can be facilitated in the throat 40 to create a vacuum and pull the leachate therethrough. The airlift venturi pump 10 further can further comprise an upstream riser section 70 in fluid communication with the upstream entry pipe 30 and configured to deliver leachate to the upstream entry pipe 30 and a downstream riser section 60 in fluid communication with the upstream entry pipe 20 and configured to deliver leachate to the downstream exit pipe 20.

The presently disclosed system and method overcome several challenges with traditional leachate removal systems for sustainable liquid flow due to limitations of flow such as waste mass heterogeneities (i.e., vertical layering and/or lateral changes in waste mix makes a single, uniform design difficult to obtain), vertical changes in the degree of waste degradation (i.e., in wet climates, degradation will increase over time and with depths resulting in a reduction of sustainable pumping rates with depth and with the lowering of liquid levels from pumping), the presence of "black goo" that impedes gas and liquid extraction, harsh environments that clog or foul pumps and equipment, and lack of sufficient site staff to keep pumps running and operational.

Pilot Testing

A pilot study was performed to evaluate the efficacy of the airlift venturi pump 10. The objective of the pilot test was to 1) determine proof of concept, that is if the pump would work in a landfill environment and at depths greater than 50 feet, 2) collect data on performance and drawdown of liquids at various distances from the pumping wells for input into a predictive model, and 3) collect operational data using various injection pressures and liquid conveyance methods to determine applicability of the technology for various landfills and geographic settings. Venturi air lift pumps were placed into two (2) pumping wells (DW-1 and DW-2) and drawdown from pumping was measured in four (4) piezometers located at distances approximately 26 feet and 52 feet from each pumping well. During the test period, liquid flow peaked at over 18 gallons per minute (GPM) within the first month of pumping in well DW-2 with an average of 10,000 gallons per day (GPD) and injection pressures ranging from 15 to 30 pounds per square inch (PSI). Subsequently flow reduced to an average flow of 5 GPM in DW-2 until the liquids in the pumping well dewatered after 3.5 months of pumping. In DW-1 the peak pumping rate was 10 GPM (and 5,000 GPD) and subsequently reduced to 1.4 GPM within three (3) months. Note that operation of DW-1 was inhibited by formation of a dark biomass within the well (common to this landfill) thus restricting flow. Drawdown at distance from the active pumping ranged from 10 to 12 feet at a distance of 50 feet after four (4) months of pumping. During the pilot test period, no maintenance was required other than to address the dark biomass generated in DW-1 with an acid treatment.

While the disclosed subject matter has been described in detail in connection with a number of embodiments, it is not limited to such disclosed embodiments. Rather, the disclosed subject matter can be modified to incorporate any number of variations, alterations, substitutions or equivalent arrangements not heretofore described, but which are commensurate with the scope of the disclosed subject matter.

Additionally, while various embodiments of the disclosed subject matter have been described, it is to be understood that aspects of the disclosed subject matter may include only some of the described embodiments. Accordingly, the disclosed subject matter is not to be seen as limited by the foregoing description, but is only limited by the scope of the claims.

What is claimed is:

1. An airlift venturi pump for collecting leachate from a solid waste landfill, comprising:
    an upstream entry pipe configured to receive the leachate from the landfill, the upstream entry pipe defining a first axis;
    an airlift section in fluid communication with the upstream entry pipe and configured to receive leachate from the upstream entry pipe, the airlift section comprising:
        an inlet pipe defining a first inside diameter,
        an outlet pipe defining a second inside diameter,
        a throat disposed between the inlet pipe and the outlet pipe, wherein the throat has a diameter that is narrower than the first inside diameter and the second inside diameter, and wherein the throat is configured to facilitate a venturi effect and transport the leachate therethrough, and
        an air conveyance pipe at least partially positioned within the first inside diameter and defining a second axis parallel with respect to the first axis, the air conveyance pipe configured to inject air into the inlet pipe; and
    a downstream exit pipe in fluid communication with the airlift section and configured to transport the leachate away from the airlift section.

2. The airlift venturi pump of claim 1, further comprising an upstream riser section in fluid communication with the upstream entry pipe and configured to deliver leachate to the upstream entry pipe and a downstream riser section in fluid communication with the downstream exit pipe and configured to deliver leachate away from the downstream exit pipe.

3. The airlift venturi pump of claim 2, wherein the airlift venturi pump is located underground at the solid landfill site, and wherein the air conveyance pipe is connected by a flange connection to an air conveyance fitting comprising a pair of 90-degree elbows, and wherein the air conveyance pipe is configured to inject air into the venturi pipe in an upward direction, and wherein the downstream exit pipe is configured to deliver leachate from the underground at the solid waste landfill to a ground surface.

4. The airlift venturi pump of claim 3, wherein the airlift venturi pump is configured to be located up to fifty feet underground at the solid landfill site.

5. The airlift venturi pump of claim 1, wherein the air conveyance pipe comprises:
    an air conveyance riser portion extending at least partially along a landfill waste column;
    an air conveyance outlet portion positioned at least partially within the first inside diameter; and
    at least one bend configured to redirect flow from the air conveyance riser portion to the air conveyance outlet portion.

6. The airlift venturi pump of claim 5, wherein at direction of flow of air along the air conveyance riser portion is opposite a direction of flow of the air along the air conveyance outlet portion.

7. The airlift venturi pump of claim 6, wherein the at least one bend comprises a first 90-degree bend and a 90-degree second bend, the first and second 90-degree bends configured to redirect flow from the air conveyance riser portion to the air conveyance outlet portion by 180 degrees.

8. The airlift venturi pump of claim 1, wherein the first inside diameter is equal to the second inside diameter.

9. A system for collecting leachate from a solid waste landfill, comprising:
    a landfill gas well that extends from a ground surface and through a landfill waste layer to a leachate layer within the solid waste landfill; and
    an airlift venturi pump disposed within the landfill gas well and configured to collect leachate from the leachate layer, the airlift venturi pump comprising:
        an upstream entry pipe configured to deliver leachate from the landfill;
        an airlift section in fluid communication with the upstream entry pipe and configured to receive leachate from the upstream entry pipe, the airlift section comprising:
            an inlet pipe defining a first inside diameter,
            an outlet pipe defining a second inside diameter,
            a throat disposed between the inlet pipe and the outlet pipe, wherein the throat has a diameter that is narrower than the first inside diameter and the second inside diameter, and
        an air conveyance pipe comprising an outlet portion that is positioned at least partially within the first inside diameter and oriented in a direction other than orthogonal with respect to the inlet pipe, the air conveyance pipe configured to inject air into the airlift section; and
        a downstream exit pipe configured to deliver leachate away from the airlift section.

10. The system of claim 9, further comprising an upstream riser section in fluid communication with the upstream entry pipe and configured to deliver leachate to the upstream entry pipe and a downstream riser section in fluid communication with the upstream entry pipe and configured to deliver leachate to the downstream exit pipe.

11. The system of claim 10, wherein the airlift venturi pump is located underground at the solid landfill site, and wherein the air conveyance pipe is connected by a flange connection to an air conveyance fitting comprising a pair of 90-degree elbows, and wherein the air conveyance pipe is configured to inject air into the venturi pipe in an upward direction, and wherein the downstream exit pipe is configured to deliver leachate from the underground at the solid waste landfill to a ground surface.

12. The system of claim 11, wherein the airlift venturi pump is configured to be located up to fifty feet underground at the solid landfill site.

13. A method for collecting leachate from a solid waste landfill, comprising:
    passing the leachate through an airlift venturi pump, the airlift venturi pump comprising an upstream entry pipe configured to receive the leachate from the landfill, an airlift section in fluid communication with the upstream entry pipe, the airlift section having an inlet pipe, an outlet pipe, and a throat disposed between the inlet pipe and the outlet pipe, the throat having a diameter that is narrower than both the inlet pipe and the outlet pipe, and a downstream exit pipe in fluid communication with the airlift section and configured to transport the leachate away from the airlift section; and introducing, by an air conveyance pipe, an air stream into the inlet pipe, wherein the air conveyance pipe is at least partially inside the inlet pipe such that the air conveyance pipe and the upstream entry pipe have parallel axes; and facilitating a venturi effect in the throat to create a vacuum and pull the leachate therethrough.

14. The method of claim 13, wherein the airlift venturi pump further comprises an upstream riser section in fluid communication with the upstream entry pipe and configured to deliver leachate to the upstream entry pipe and a downstream riser section in fluid communication with the upstream entry pipe and configured to deliver leachate to the downstream exit pipe.

15. The method of claim 14, wherein the airlift venturi pump is located underground at the solid landfill site, and wherein the air conveyance pipe is connected by a flange connection to an air conveyance fitting comprising a pair of 90-degree elbows, and wherein the air conveyance pipe is configured to inject air into the venturi pipe in an upward direction, and wherein the downstream exit pipe is configured to deliver leachate from the underground at the solid waste landfill to a ground surface.

16. The method of claim 15, wherein the airlift venturi pump is configured to be located up to fifty feet underground at the solid landfill site.

\* \* \* \* \*